United States Patent [19]

Heckel

[11] 4,300,349
[45] Nov. 17, 1981

[54] GAS TURBINE WITH HEAT-INSULATING LINING

[75] Inventor: Johann Heckel, Fellbach, Fed. Rep. of Germany

[73] Assignee: Daimler-Benz Aktiengesellschaft, Stuttgart, Fed. Rep. of Germany

[21] Appl. No.: 80,027

[22] Filed: Sep. 28, 1979

[30] Foreign Application Priority Data

Sep. 29, 1978 [DE] Fed. Rep. of Germany ....... 2842410

[51] Int. Cl.³ ............................. F02C 7/18; F02C 7/24
[52] U.S. Cl. ............................. 60/39.51 R; 60/39.32; 60/722; 415/219 R
[58] Field of Search ......................... 428/550, 552, 566; 416/97 A; 60/39.32, 39.51 R, 39.51 H, 722, 754, 753; 415/116, 219 R; 138/114, 149

[56] References Cited

U.S. PATENT DOCUMENTS

| 3,167,914 | 2/1965 | Sayonuzzi | 60/39.32 |
| 3,196,611 | 7/1965 | Henny | 60/39.51 H |
| 3,267,674 | 8/1966 | Collman et al. | 60/39.51 H |
| 3,656,863 | 7/1970 | De Feo | 416/97 A |
| 3,999,376 | 12/1976 | Jeryan et al. | 60/39.51 H |
| 4,022,542 | 5/1977 | Barbeau | 416/97 A |

OTHER PUBLICATIONS

Alliegro, R. A., et al, "Ceramics–Key to the Hot Turbine", Gas Turb. Intl., Feb., 1973, pp. 30–36.

*Primary Examiner*—Robert E. Garrett
*Attorney, Agent, or Firm*—Craig and Antonelli

[57] ABSTRACT

A gas turbine which includes a compressor, a combustion chamber, a turbine inlet, and at least one turbine as well as a diffusor disposed at an outlet of the gas turbine. An external metallic supporting housing is provided with wall parts for enclosing the combustion chamber, the turbine inlet, and the diffusor. At least the wall parts in a vicinity of the combustion chamber are provided with a heat-insulating inner lining. The heat-insulating inner lining includes a gas-permeable porous material disposed at a distance from the wall parts of the housing so as to define an air distribution space which is sealed from the exterior. The air distribution space is adapted to be connected with an air source.

9 Claims, 3 Drawing Figures

GAS TURBINE WITH HEAT-INSULATING LINING

The present invention relates to a turbine arrangement and, more particularly, to a gas turbine which includes a compressor, a combustion chamber, a turbine inlet, at least one turbine, as well as a diffusor disposed at an outlet of the turbine.

A gas turbine of the aforementioned type is proposed in, for example, "Motortechnische Zeitschrift", 1977, pages 209 et seq wherein a metal external supporting housing encloses, inter alia, a combustion chamber, the turbine inlet, and the diffusor with wall parts and wherein at least the wall parts in a vicinity of the combustion chamber are provided with a heat-insulating inner lining.

With the use of ceramic materials in the construction of gas turbines, very high process temperatures 1300° C. or more are permissible; however, these temperatures must be prevented from reaching the supporting metal parts and, for this purpose, heat insulating linings are provided.

A disadvantage of the use of heat insulating linings resides in the fact that the high temperature differential which is required between the ceramic parts and the supporting metal parts necessitates a very voluminous insulating layer thickness resulting in an increase of not only the structural volume of the gas turbine but also the total overall weight.

The aim underlying the present invention essentially resides in providing a heat-insulating inner lining for a gas turbine which permits a uniform temperature decrease even with a reduced thickness of a heat insulating layer.

In accordance with advantageous features of the present invention, the heat insulating inner lining consists of a gas permeable porous material with the lining being disposed at a distance from wall parts of the housing so that an air distribution space, sealed off from the exterior, is formed on an underside of the heat insulating inner lining which air distribution space is connected with a pressure joint of a blower or the like.

By virtue of the porosity and permeability of the fiber-ceramic material employed for the heat insulating inner lining, a small volume of air is forced through the insulating material in a direction opposite to the heat flux thereby producing a forced-convective return transport of heat into the combustion chamber. Sufficient convective flow occurs even at a relatively low pressure differential.

In particular, the walls of the combustion chamber space and the exhaust gas diffusor must be insulated. Advantageously, the air required for this purpose can be tapped off, for example, after the compressor on the gas turbine. The required pressure differential would be equal to the pressure loss in the heat exchanger, regenerator, or the like which normally must be provided in any case.

Since a definite thermodynamic relationship exists between the process temperature, compressor pressure, air volume or throughput, and pressure loss in the heat exchanger, an automatic adjustment of the convective heat protection is provided in dependence upon the operating state of the gas turbine.

In accordance with further advantageous features of the present invention, spacing elevation such as ribs, bumps, strips, or the like may be mounted on the inside housing wall parts which elevations may be coated with heat insulation or on the heat insulating liner itself on a side facing housing wall parts.

The spacing elevations of the present invention may be made integral with the housing wall parts or with the heat insulating inner lining. Furthermore, the spacing elevations may be mounted and fastened to the housing wall parts and/or the heat insulating inner liner in a subsequent operation.

Preferably, the heat insulating inner liner of the present invention consists of a fiber-ceramic composite material.

In accordance with yet further advantageous features of the present invention, the inlet housing, surrounding the turbine inlet, and/or the housing of a diffusor may be provided with an heat-insulating inner lining.

Additionally, the air distribution space of the heat insulating inner liner may be connected with the high-pressure side of the compressor of the gas turbine at a point located forwardly of an inlet to a heat exchanger, regenerator, or the like.

Advantageously, the subsequently mounted spacing elevations themselves may consist of a heat-insulating fiber-ceramic composite material of, for example, rock wool or asbestos foam.

Accordingly, it is an object of the present invention to provide a gas turbine construction which avoids, by simple means, shortcomings and disadvantages encountered in the prior art.

Another object of the present invention resides in providing a gas turbine construction wherein high operating temperatures are prevented from reaching the supporting metal parts by way of a relatively thin insulating layer.

Yet another object of the present invention resides in providing a gas turbine construction which permits a uniform temperature decrease without increasing the structural volume or total weight of the gas turbine.

A further object of the present invention resides in providing a gas turbine construction which provides for an automatic adjustment of heat protection in dependence upon an operating state of the gas turbine.

A still further object of the present invention resides in providing a gas turbine construction which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein.

Figure 1:
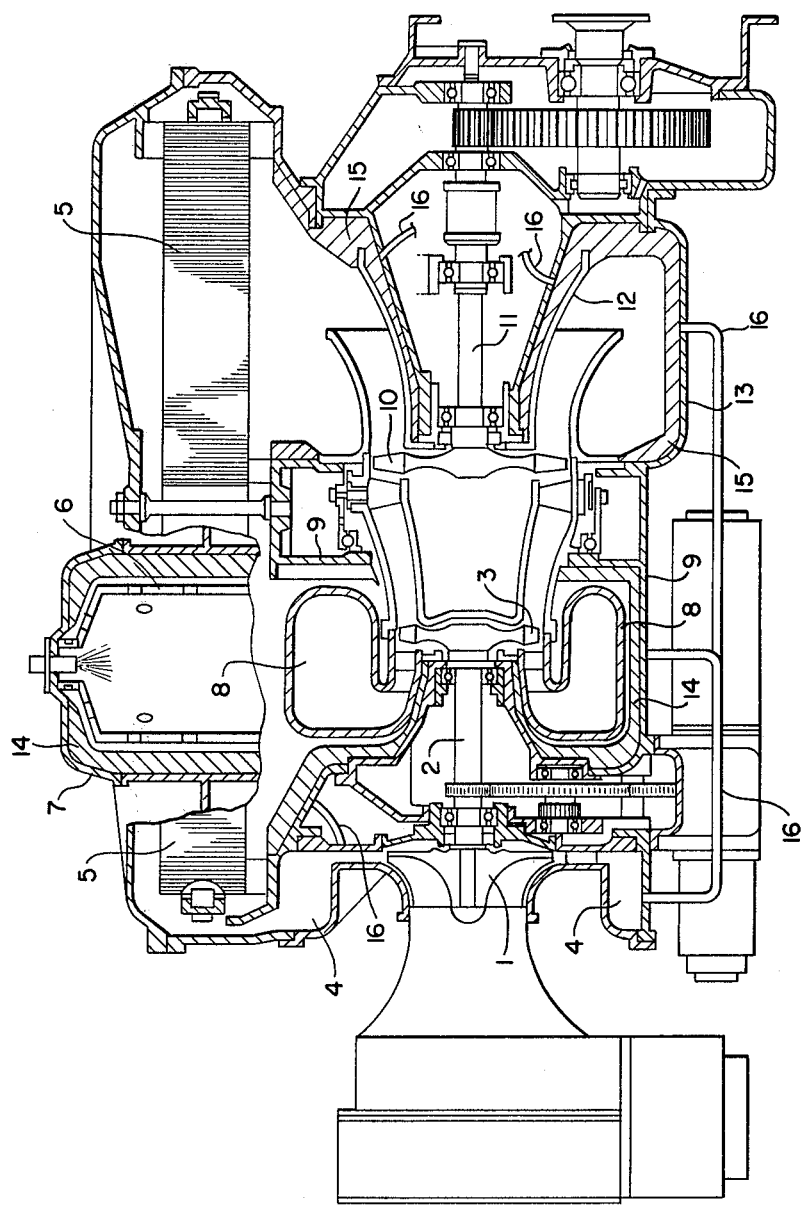
FIG. 1 is a longitudinal partial cross-view of a gas turbine provided with a heat-insulating inner lining for a combustion chamber housing and exhaust diffusor in accordance with the present invention.

Referring now to the drawings wherein like reference numerals are used throughout the various views to designate like parts and, more particularly, to FIG. 1, according to this figure, a gas turbine, constructed as a twin-shaft unit, includes a first shaft 2 on which is mounted a compressor wheel 1 and a compressor turbine 3. Combustion air is drawn in and compressed by the compressor wheel 1 and is forced into a compressor spiral 4. In the construction illustrated, a rotary regenerator 5 is provided for utilizing the heat contained in the exhaust gas from the exhaust gas turbine and for supplying the gas turbine with the combustion air compressed by the compressor 1. The rotary regenerator 5 is a slowly driven disc traversed axially by the gas flow with the disc being moved in a sealing manner so as to absorb heat at the exhaust outlet and to release heat through the air inlet. The passage of the compressed combustion air through the regenerator 5 produces a definite pressure drop in th combustion air. The combustion air which is heated up as it leaves the regenerator 5 enters a combustion chamber housing 7 or an inlet housing 9 in which the combustion chamber 6 is mounted to be freely swingable to a certain degree and supported at only a few points on the housing.

The combustion chamber 6 makes a transition to an inlet spiral 8 at its lower end, the combustion chamber 6 and the inlet spiral 8 may be constructed of, for example, a ceramic material. Fuel is injected into the interior of the combustion chamber 6 in a conventional manner with the fuel being burnt with an addition of combustion air to the combustion chamber from the combustion chamber housing 7 thereby strongly heating both itself and the compressed air.

Since middle wall housing parts of the combustion chamber housing 7 or the inlet housing 9 could not withstand the resulting process temperature during the operation of the gas turbine, a heat-insulating inner lining 14 is provided which will be described in greater detail hereinbelow.

The gas emerging at high velocity from the inlet spiral 8 and/or from an axial guide wheel strikes the compressor turbine 3 driving the compressor wheel 1. The gas emerging from the compressor turbine 3, after passing through a preferably adjustable guide wheel, strikes the blade of a working turbine 10 mounted on a working shaft 11, which shaft 11 constitutes the second shaft of the gas turbine, with the mechanical work output being taken off through a reduction gear from the shaft 11. The exhaust gas leaving the working turbine 10 at high velocity is retarded in the exhaust gas diffusor 12 which is surrounded by a diffusor housing 13 and is discharged into the open air by passing through the regenerator 5. The exhaust gas is still at a very high temperature in the exhaust gas diffusor 12, which temperature cannot ordinarily be withstood by the diffusor housing 13. Therefore, a heat insulating inner lining 15 is provided for protecting the diffusor housing 13.

A porous composite material on a fiber-ceramic base is employed as the heat-insulating inner linings 14 and 15.

Figure 2:
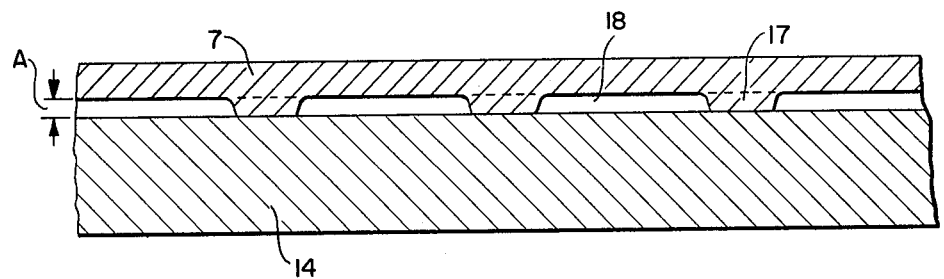
FIG. 2 is a partial cross sectional view of another embodiment of a heat-insulating inner lining in accordance with the present invention which enables an admission of convection air.
Figure 3:
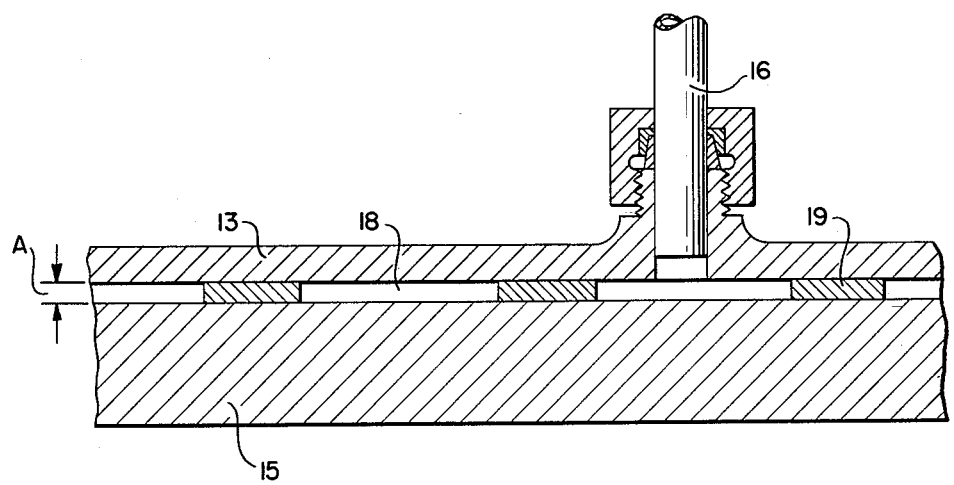
FIG. 3 is a partial cross sectional view of a further embodiment of a heat-insulating inner lining in accordance with the present invention which also enables the admission of convention air.

As shown most clearly in FIGS. 2 and 3, the heat insulating inner lining 14, 15 is mounted at a distance A from housing wall parts 7 and 13 by way of spacing rib 17 and/or spacing strips 19 so as to define an air distribution space 18 between the lining 14 or 15 and the wall part 7 or 13. The air distribution space 18 extends over an entire inner surface of the housing parts 7, 13 which are lined in a heat-insulating manner and is closed off from the outside.

The air distribution space 18 is connected with a compressor spiral 4 of the compressor wheel by a plurality of cooling air lines 16 (FIGS. 1 and 3) connected to the housing wall parts 7, 13. A pressure prevails in the compressor spiral 4 which is higher, by the pressure loss of the combustion air in the regenerator 5, than in the combustion chamber housing 7. The pressure differential creates a driving pressure differential which is suitable for forcing convection air through the air distribution space 18 through the porosities of the heat insulating inner lining 14 or 15 into the interior of the heat-protective housing 7 and thus conveying heat by forced convection from the interior of the heat-insulating liner to the interior of the housing 7. This creates a higher temperature gradient inside the heat insulating inner lining or, in other words, a higher temperature differential may be effectively reduced with a thinner wall thickness for the insulating layer.

The air employed for forced convective cooling of the heat insulated inner lining of the combustion chamber housing 7 and the inlet housing 9 mixes with the process or combustion air conducted through the regenerator 5. Admittedly, the convection air bypasses the regenerator 5 and consequently does not participate in the regenerative process but, in compensation therefore, the lost heat which is otherwise conducted to the exterior is recycled to a large extent so that heat is nevertheless recovered. The type of insulation of the space of the combustion chamber 6 proposed by the present invention does not result in any losses in the second turbine process and, on the contrary an improvement is obtained because of the decrease in losses to the exterior.

The air employed for forced convective cooling of the heat insulating inner lining 15 of the exhaust gas diffusor 12 expands unused into the exhaust gas diffusor 12. Also, in this situation, the pressure trapped between the high pressure side of the compressor and the low pressure side of the exhaust gas turbine is much greater than corresponding pressure differential at the insulation of the combustion chamber 6. Therefore, an appropriate throttling permits careful adjustment of the convection air volume in the exhaust gas section.

As shown in FIG. 2, the spacing ribs 17 are mounted on the wall of the combustion chamber housing 7. In FIG. 3, spacing strips 19 are secured by, for example, suitable adhesives or cement to the heat insulating inner lining 15 while the wall of the diffusor housing 13 is smooth along its inner side. Advantageously, the spacing strips can also be made of heat-insulating and elastic material such as, for example, rock wool or asbestos foam.

While I have shown and described only one embodiment in accordance with the present invention, it is understood that the same is not limited thereto but is subject to numerous changes and modifications as known to one having ordinary skill in the art, and I therefore do not wish to be limited to the details shown and described herein, but intend to cover all such modifications as are encompassed by the scope of the appended claims.

I claim:

1. A gas turbine which includes a combustion chamber means, a gas turbine inlet means, a diffusor means disposed at an outlet of the gas turbine, an external metallic supporting housing means including wall parts for enclosing the combustion chamber means, the gas turbine inlet means, and diffusor means, and heat insulating inner lining means disposed at least in an area of the combustion chamber means, characterized in that the heat insulating inner lining means is formed of a gas-permeable porous material consisting essentially of an elastic fiber-ceramic composite material, means are provided for mounting the lining means on the wall parts at a predetermined distance from the wall parts so as to define a sealed air distribution space between the lining means and associated wall parts, said mounting means including a multitude of spacers between the inner side of the wall parts facing the lining means and the associated lining means, and in that means are provided for communicating the air distribution space with an air source, whereby air may be forced through the insulating lining in a direction opposite to heat flux from said combustion chamber means thereby producing a forced convective return transport of heat into the combustion chamber means.

2. A gas turbine according to claim 1, characterized in that said spacers are mounted on the inner side of the wall parts facing the lining means and are coated with the heat-insulating material.

3. A gas turbine according to claim 1, characterized in that the spacers are formed as one of ribs, bumps, and spacer strips.

4. A gas turbine according to claim 1, characterized in that the spacers are integrally formed with the wall parts of the housing means.

5. A gas turbine according to claim 1, characterized in that at least one of the wall parts enclosing the gas turbine inlet means and the wall parts enclosing the diffusor means are provided with a heat insulating inner means.

6. A gas turbine according to claim 1 or 5, which includes a compressor means and a heat exchanger means, characterized in that the air distribution space communicates with a high pressure side of the compressor means at a position upstream of the heat exchanger means.

7. A gas turbine according to claim 1, characterized in that the said spacers consist essentially of a heat-insulating fiber-ceramic composite material.

8. A gas turbine according to claim 7, characterized in that the heat-insulating fiber-ceramic composite material of the spacers is one of rock woll and asbestos foam.

9. A gas turbine according to claim 1, characterized in that the spacers are integrally formed with the heat-insulating inner lining means.

* * * * *